Patented Oct. 8, 1935

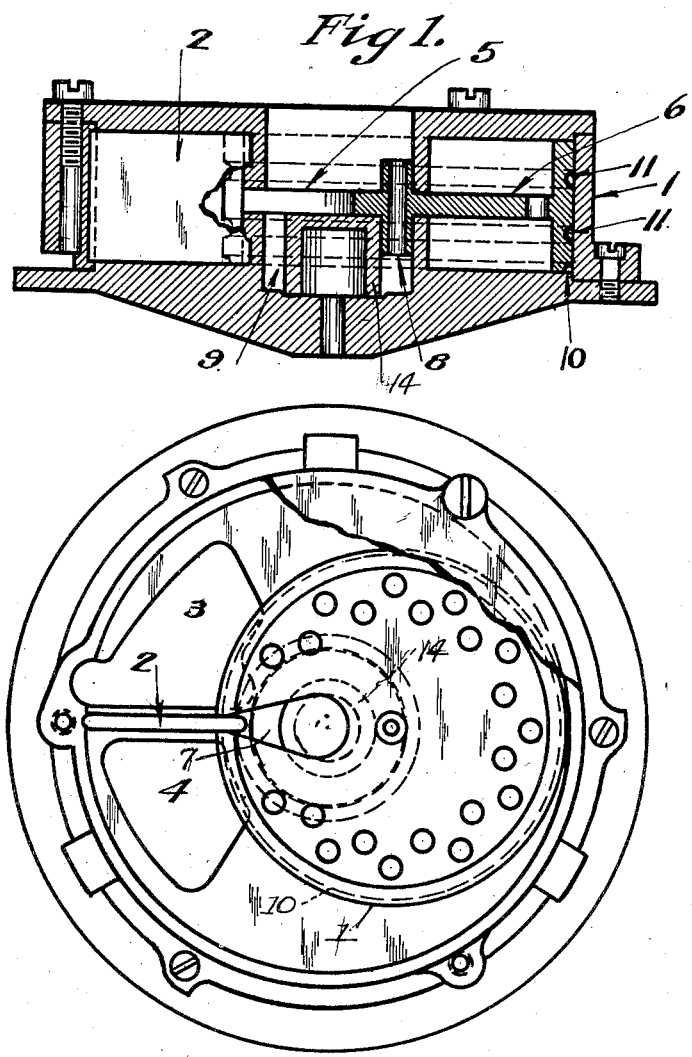

2,016,347

UNITED STATES PATENT OFFICE 2,016,347

OSCILLATING PISTON FOR FLUID METERS

Richard H. Smith, Jr., Hamilton, Mass.

Application March 6, 1934, Serial No. 714,294

2 Claims. (Cl. 73—37)

My invention relates to improvements in fluid meters, and is herein illustrated as embodied in a meter of the oscillating piston type which is particularly adapted for use in dispensing and measuring fluids such as water or oil. Meters of the type referred to commonly comprise a measuring chamber having therein a piston or similar part arranged for oscillation under fluid pressure. Such meters, as heretofore constructed, frequently become inaccurate or inoperative because of the clogging of the moving parts by hard particles of foreign matter which pass the filter screen ordinarily used in the fluid supply line or which are formed in the meter itself by erosion. These particles may become wedged between the piston and the walls of the measuring chamber with the result that the normal operation of the piston is prevented.

In view of the foregoing, it is an object of my invention to devise an improved meter of the type mentioned which will not become clogged or inoperative through the accumulation of dirt or other foreign matter. To this end, and as illustrated, the invention provides a meter having a measuring chamber and a piston arranged to oscillate within the chamber under the pressure of fluid supplied to the chamber, the piston being so constructed that particles of foreign matter cannot become wedged between the walls of the chamber and the piston in such manner as to prevent normal operation of the piston. Preferably, and as shown, the periphery of the piston is provided with one or more grooves extending in the general direction of the flow of the fluid through the meter and adapted to receive the particles of foreign matter and conduct them to the outlet of the meter.

The invention in its various aspects is disclosed in the following detailed description and in the accompanying drawing, and will be pointed out in the claims.

In the drawing,

Fig. 1 is a sectional side view of the measuring chamber and associated parts of a meter embodying my invention; and Fig. 2 is a plan view of the measuring chamber and parts with the division plate broken away.

The type of meters of which this invention is to be applied to, consists generally of a cylindrical casting comprising a measuring chamber 1 with a bridge or division plate 2 having an outlet port 3 on one side and an inlet port 4 on the other side.

The piston 5 is a cylindrical ring having a central horizontal perforated web 6 which carries a post 8 at the central portion thereof. The piston ring with its web is slotted at 7 to fork over or embrace the bridge or division plate 2. The portion of the post 8 extending below the web guides the piston within the measuring chamber around a roller 14 mounted in a well 9 and the portion extending above the web engages a driving arm, by which its motions are transmitted through a set of intermediate gears to the register which indicates the quantity of fluid displaced. The indicating mechanism and connections are not shown herein, but may be of any suitable known type.

The piston itself does not rotate about its own axis, but slides or oscillates back and forth, with the walls of the slot 7 engaging opposite sides of the bridge, and always moving in the direction of the flow of the fluid through the meter. The arrangement of the ports is such that they are continually open to enlarging and contracting spaces so the fluid has free flow at all times. The displacing action of the piston continues as long as fluid is passed through the meter and since the incoming fluid continually tends to force itself between the walls of the piston and the measuring chamber the piston is caused to oscillate about the bridge 2 as a pivot but the post 8 is driven in a circular course under the guidance of the wall of the well 9 and the roller 14.

The piston must at all times be free from side strain and a small clearance is allowed between the piston outer wall and the cylindrical inner wall of the chamber when the piston occupies the position shown in Fig. 2 or when the inlet port is open and the outlet port of the chamber is closed by the piston.

The piston is provided with a recess or groove 10 which extends along the lower outer edge portions of its periphery. This groove is important in that it provides clearance between the inner portion of the lower side wall and bottom of the measuring chamber and the outer wall of the piston 5. Thus when hard particles of foreign matter of sufficient size to clog the piston enter the chamber they will, because of their weight, drop to the bottom of the chamber and upon oscillation of the piston will be pushed toward the wall of the chamber by the piston but will be positioned, out of the way, in the groove 10 when the variable line of contact of the piston with the wall of the chamber passes the particle.

It is to be noted that, since the groove 10 extends in the general direction of the flow of fluid through the meter, and since the small opening formed by the groove between the piston and the wall of the chamber rapidly shifts its position in the direction of the flow, there will be little or no leakage of fluid past the piston because of the groove.

In practice, it has been found that after a few oscillations of the piston grit or other foreign material entering the chamber is discharged at the outlet. If desired, additional grooves 11 higher up on the periphery of the piston may be included to collect and dispose of particles so light that they do not drop to the bottom of the chamber. Thus, it will be apparent that I have provided a comparatively simple device which eliminates any possibility of grit or the like to become wedged between the piston and the chamber and create friction thus causing the meter to function improperly or stop it entirely.

Having described my invention, what I claim as new and desire to secure by Letters Patent of the United States is:—

1. A fluid meter comprising a measuring chamber, an inlet port, an outlet port, and a piston arranged to oscillate in the chamber in continuous engagement with the wall of the chamber, said piston having a peripheral groove extending around the circumference of the piston for the passage of foreign matter between the piston and the wall of the chamber in the direction of flow of fluid.

2. A fluid meter comprising a measuring chamber having a vertical wall, an inlet port, an outlet port, and a piston mounted in the chamber for movement about a vertical axis with successive portions of its outer surface in engagement with the wall of the chamber, the outer surface of said piston adjacent to the bottom of the chamber being recessed around the circumference of the piston to provide a passage between the side wall of the piston and the wall of the chamber for conducting foreign material toward the outlet port.

RICHARD H. SMITH, Jr.